United States Patent
Malaviya et al.

(10) Patent No.: US 11,561,341 B2
(45) Date of Patent: Jan. 24, 2023

(54) CUTOFF SHIFTED OPTICAL FIBRE

(71) Applicant: Sterlite Technologies Limited, Aurangabad (IN)

(72) Inventors: Apeksha Malaviya, Aurangabad (IN); Srinivas Reddy, Aurangabad (IN); MalleshwaraRao Lanke, Aurangabad (IN); Anand Kumar Pandey, Aurangabad (IN)

( * ) Notice: Subject to any disclaimer, the term of this patent is extended or adjusted under 35 U.S.C. 154(b) by 0 days.

(21) Appl. No.: 16/942,443

(22) Filed: Jul. 29, 2020

(65) Prior Publication Data
US 2021/0033781 A1 Feb. 4, 2021

(30) Foreign Application Priority Data
Jul. 29, 2019 (IN) .............................. 201921030566

(51) Int. Cl.
*G02B 6/036* (2006.01)
*G02B 6/028* (2006.01)
*G02B 6/02* (2006.01)

(52) U.S. Cl.
CPC .......... *G02B 6/0365* (2013.01); *G02B 6/028* (2013.01); *G02B 6/0281* (2013.01); *G02B 6/0286* (2013.01); *G02B 6/036* (2013.01); *G02B 6/03661* (2013.01); *G02B 6/02009* (2013.01); *G02B 6/0283* (2013.01); *G02B 6/0285* (2013.01); *G02B 6/02266* (2013.01)

(58) Field of Classification Search
None
See application file for complete search history.

(56) References Cited

U.S. PATENT DOCUMENTS

2021/0033782 A1 * 2/2021 Pandey .............. G02B 6/02019

FOREIGN PATENT DOCUMENTS

EP 2588905 B1 * 4/2015 ........... G02B 6/0286

* cited by examiner

*Primary Examiner* — Michelle R Connelly
(74) *Attorney, Agent, or Firm* — Steven R. Fairchild; Michael J. Pennington

(57) ABSTRACT

The present disclosure provides an optical fibre. The optical fibre includes a core extended from a central longitudinal axis to a first radius r1. Further, the optical fibre includes a first trench region extended from a second radius r2 to a third radius r3, a second trench region extended from the third radius r3 to a fourth radius r4 and a cladding region extended from the fourth radius r4 to a fifth radius r5.

18 Claims, 2 Drawing Sheets

CUTOFF SHIFTED OPTICAL FIBRE

BACKGROUND OF THE INVENTION

Field of the Invention

The present disclosure relates to the field of optical fiber. Particularly, the present disclosure relates to a cutoff shifted optical fiber with high mode field diameter.

Description of the Related Art

With the advancement of science and technology, various modern technologies are being employed for communication purposes. One of the most important modern communication technologies is optical fiber communication technology using a variety of optical fibers. Optical fiber is used to transmit information as light pulses from one end to another. The telecommunication industry is continuously striving for designs to achieve high optical signal to noise ratio and low losses. The ongoing research suggests that the optical fiber of G.654.E category is an improved version of G.654.6 and an alternative to G.652.D that faces challenges in 400G transmission in territorial long haul communication due to non-linear effects. In addition, major challenges in 400G long haul communication are due to non-linear effects, low optical signal to noise ratio and high attenuation.

In light of the above stated discussion, there is a need for an optical fiber that overcomes the above cited drawbacks.

SUMMARY OF THE INVENTION

In an aspect, the present disclosure provides an optical fibre. The optical fibre includes a core. In addition, the optical fibre includes a first trench region. Further, the optical fibre includes a second trench region. Furthermore, the optical fibre a cladding region. The core has a first relative refractive index $\Delta 1$. The first relative refractive index $\Delta 1$ of the core is in a range of about 0 to 0.12. Moreover, the first trench region is defined by a relative refractive index $\Delta 3$. The first trench region has a first alpha $\alpha_{trench-1}$. The second trench region is adjacent to the first trench region. The second trench region has a relative refractive index LA. Also, the second trench region has a second alpha $\alpha_{trench-2}$. The cladding region surrounds the second trench region. The optical fibre 100 has attenuation of less than or equal to 0.17 dB/km at a wavelength of 1550 nanometer. The optical fibre has a mode field diameter in a range of about 12 micron to 13 micron. The optical fibre has gradual variation in core and trench regions of the 15 refractive index profile.

A primary object of the present disclosure is to provide an optical fiber with low loss.

Another object of the present disclosure is to provide the optical fiber with large mode field diameter.

In an embodiment of the present disclosure, the optical fibre has macrobend loss up to 0.1 decibel per 100 turns corresponding to wavelength of 1550 nanometer at bending radius of about 30 millimeter and macro bend loss up 20 to 0.1 decibel per 100 turns corresponding to wavelength of 1625 nanometer at bending radius of about 30 millimeter.

In an embodiment of the present disclosure, the optical fibre has chromatic dispersion in range of about 17 pico second per nanometer-kilometer to 25 23 pico second per nanometer-kilometer at wavelength of 1550 nanometer. In addition, the optical fibre has a cable cut off wavelength up to 1530 nanometer.

In an embodiment of the present disclosure, the optical fibre further includes a buffer clad region. The buffer clad region is defined by a second relative refractive index $\Delta 2$. In addition, the buffer clad region separates the core and the first trench region.

In an embodiment of the present disclosure, the core has a first radius r1. The first radius r1 is in range of at least one of 2.5 micron to 5 micron and 2 micron to 3.15 micron.

In an embodiment of the present disclosure, the optical fibre further includes a buffer clad region. The buffer clad region has a second radius r2. The second radius r2 is in range of at least one of 5 micron to 7 micron and 3 micron to 10 6 micron. The buffer clad region has a second relative refractive index $\Delta 2$ of about 0.

In an embodiment of the present disclosure, the cladding region has a fifth radius r5. The fifth radius r5 is about 62.5 micron. The cladding region has a third relative refractive index $\Delta 5$ of about 0.

In an embodiment of the present disclosure, the first trench region has a third radius r3. The third radius r3 is in range of at least one of 12 micron to 16 micron and 12 micron to 20 micron. The relative refractive index $\Delta 3$ is in range of at least one of −0.25 to −0.35 and −0.3 to −0.46. The first alpha $\alpha_{trench-1}$ of the first trench region is in a range of at least one of about 3 to 6 and 1.5 to 2.

In an embodiment of the present disclosure, the second trench region has a fourth radius r4. The fourth radius r4 is in range of at least one of 24 micron to 28 micron and 26 micron to 30 micron. The relative refractive index $\Delta 4$ is in range of at least one of −0.4 to −0.55 and −0.41 to −0.57. The second alpha $\alpha_{trench-2}$ of the second trench region is in a range of at least one of 3 to 6 and 5 to 9.

In an embodiment of the present disclosure, an absolute value of the relative refractive index $\Delta 4$ of the second trench region is greater than an absolute value of the relative refractive index $\Delta 3$ of the first trench region.

In another aspect, the present disclosure provides an optical fibre. The optical fibre includes a core. In addition, the optical fibre includes a first trench region. Further, the optical fibre includes a second trench region. Furthermore, the optical fibre a cladding region. The core has a first relative refractive index $\Delta 1$. The first relative refractive index $\Delta 1$ of the core is in a range of 0 to 0.12. Moreover, the first trench region has a relative refractive index $\Delta 3$. The first trench region has a first alpha $\alpha$trench-1. The second trench region is adjacent to the first trench region. The second trench region has a relative refractive index $\Delta 4$. Also, the second trench region has the second alpha $\alpha$trench-2. The absolute value of the relative refractive index $\Delta 4$ is greater than the absolute value of the relative refractive index $\Delta 3$. The cladding region surrounds the second trench region. The optical fibre 100 has attenuation of less than or equal to 0.17 dB/km at a wavelength of 1550 nanometer. The optical fibre has a mode field diameter in a range of about 12 micron to 13 micron. The optical fibre has gradual variation in core and trench regions of refractive index profile.

In an embodiment of the present disclosure, the optical fibre has macrobend loss up to 0.1 decibel per 100 turns corresponding to wavelength of 1550 nanometer at bending radius of about 30 millimeter and macrobend loss up to 0.1 decibel per 100 turns corresponding to wavelength of 1625 nanometer at bending radius of about 30 millimeter.

In an embodiment of the present disclosure, the optical fibre has chromatic dispersion in range of about 17 pico second per nanometer-kilometer to 23 pico second per nanometer-kilometer at wavelength of 1550 nanometer. In addition, the optical fibre has a cable cut off wavelength up to 1530 nanometer.

In an embodiment of the present disclosure, the optical fibre further includes a buffer clad region. The buffer clad region has a second relative refractive index Δ2. In addition, the buffer clad region separates the core and the first trench region.

In an embodiment of the present disclosure, the core has a first radius r1. The first radius r1 is in range of at least one of 2.5 micron to 5 micron and 2 micron to 3.15 micron.
[0021] In an embodiment of the present disclosure, the optical fibre further includes a buffer clad region. The buffer clad region has a second radius r2. The second radius r2 is in range of at least one of 5 micron to 7 micron and 3 micron to 6 micron. The buffer clad region has a second relative refractive index Δ2 of about 0. 10.

In an embodiment of the present disclosure, the cladding region has a fifth radius r5. The fifth radius r5 is about 62.5 micron. The cladding region has a third relative refractive index Δ5 of about 0. 15.

In an embodiment of the present disclosure, the first trench region has a third radius r3. The third radius r3 is in range of at least one of 12 micron to 16 micron and 12 micron to 20 micron. The relative refractive index Δ3 is in range of at least one of −0.25 to −0.35 and −0.3 to −0.46. The first alpha αtrench-1 of the first trench region is in a range of at least one of about 3 to 6 and 1.5 to 2. 20.

In an embodiment of the present disclosure, the second trench region has a fourth radius r4. The fourth radius r4 is in range of at least one of 24 micron to 28 micron and 26 micron to 30 micron. The relative refractive index Δ4 is in range of at least one of −0.4 to −0.55 and −0.41 to −0.57. The second alpha $α_{trench-2}$ of the second trench region is in a range of at least one of 3 to 6 and 5 to 9.

BRIEF DESCRIPTION OF DRAWING

Figure 1:
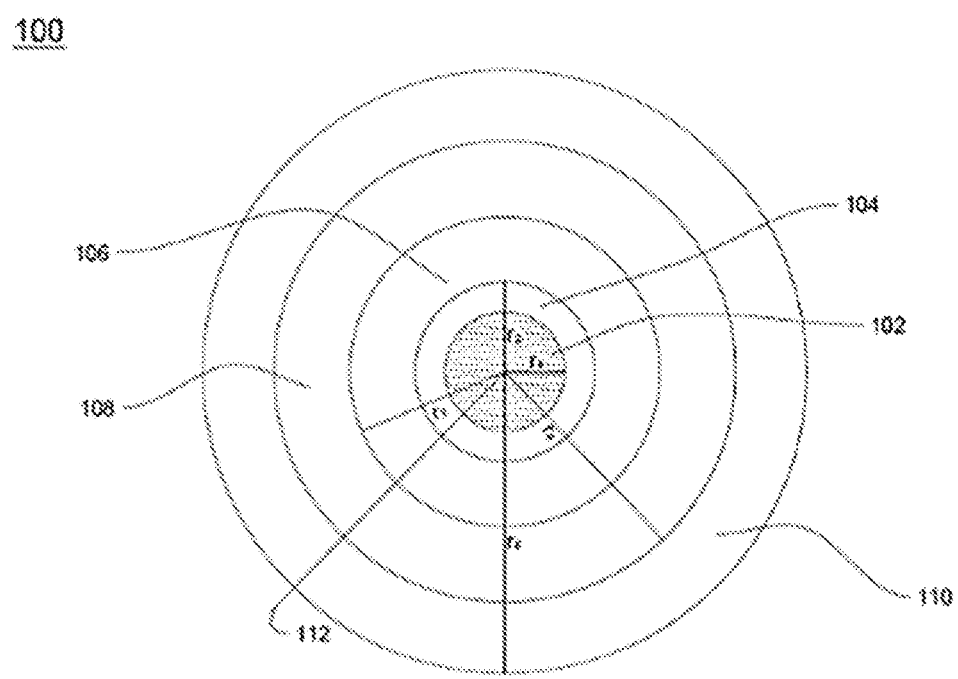
Figure 2:
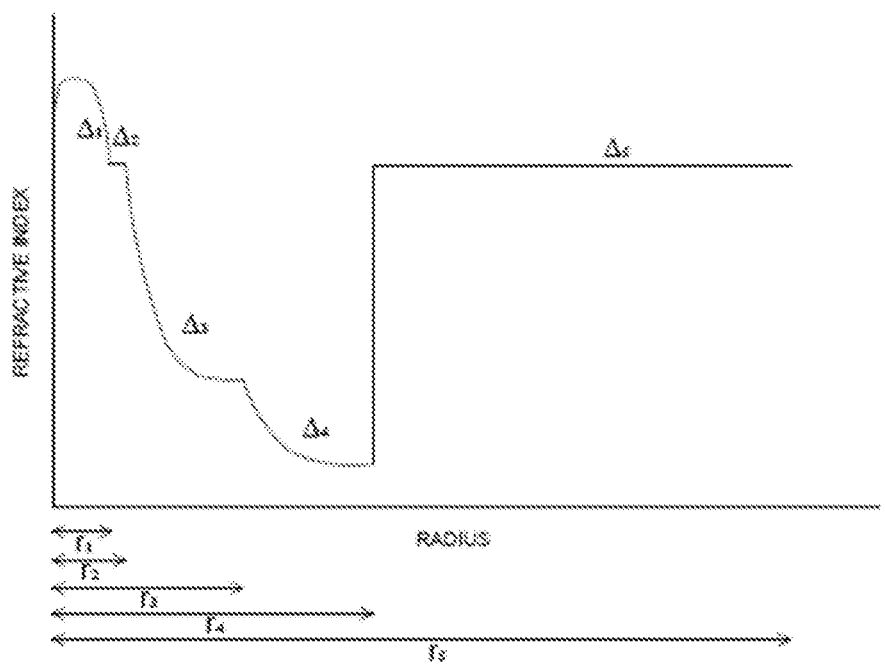

Having thus described the disclosure in general terms, reference will now be made to the accompanying figures, wherein:

FIG. 1 illustrates a cross-sectional view of an optical fibre, in accordance with various embodiments of the present disclosure; and FIG. 2 illustrates a refractive index profile of the optical fibre, in accordance with various embodiments of the present disclosure.

It should be noted that the accompanying figures are intended to present illustrations of exemplary embodiments of the present disclosure. These 25 figures are not intended to limit the scope of the present disclosure. It should also be noted that accompanying figures are not necessarily drawn to scale.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced items.

FIG. 1 illustrates a cross-sectional view of an optical fibre 100, in accordance with various embodiments of the present disclosure. In general, optical fibre is a thin strand of glass or plastic capable of transmitting optical signals. In an embodiment of the present disclosure, the optical fibre 100 is configured to transmit information over long distances with high optical signal to 25 noise ratio, low non-linear effects, low latency and low attenuation. The optical fibre 100 of the present disclosure is fully compliant with the requirement of ITU (International Telecommunication Union-Telecommunication Standardization Sector)-G.654 E standard.

The optical fibre 100 includes a core 102, a buffer clad region 104, a first trench region 106, a second trench region 108 and a cladding region 110. In general, core is an inner part of an optical fibre and cladding is an outer part of the optical fibre. In an embodiment of the present disclosure, the core 102 is defined along a central longitudinal axis 112 of the optical fibre 100. The central longitudinal axis 112 is an imaginary axis passing through center of the optical fibre 100.

In an embodiment of the present disclosure, the core 102 of the optical fibre 100 has a first relative refractive index Δ1. In general, relative 10 refractive index is a measure of relative difference in refractive index between the two regions. In an embodiment of the present disclosure, refractive index profile determines relationship between refractive index of the optical fibre 100 and radius of the optical fibre 100. In an embodiment of the present disclosure, manufacturing of the optical fibre 100 is carried out after manufacturing of a preform. Further, the refractive index profile of the optical fibre 100 is determined during manufacturing of the preform of the optical fibre 100.

The expression used for calculating the relative refractive index is produced below:

$$\Delta i = 100 \times (n_i^2 - n_{clad}^2 / 2 \times n_i^2)$$

wherein, $n_{clad}$: refractive index of the pure silica;

$n_i$: refractive index of the ith layer; 25

$\Delta_i$: the relative refractive index of the ith layer.

In addition, the core 102 has maximum refractive index $n_{max}$. In an embodiment of the present disclosure, the core 102 has the first relative refractive index Δ1 in range of about 0 to 0.12. In another embodiment of the present disclosure, the core 102 has the first relative refractive index Δ1 in range of about 0 to 0.1. In yet another embodiment of the present disclosure, range of the first relative refractive index Δ1 of the core 102 of the optical fibre 100 may vary.

Further, the core 102 has profile shape parameter α (alpha). In an embodiment of the present disclosure, parameter alpha α is in range of about 4 to 9 for the core 102 of the optical fibre 100. In another embodiment of the present disclosure, parameter alpha α is in range of about 5 to 9 for the core 102 of the optical fibre 100. In yet another embodiment of the present disclosure, range of parameter alpha α of the core 102 of the optical fibre 100 may vary.

Furthermore, the core 102 of the optical fibre 100 has a first radius r1. In an embodiment of the present disclosure, the first radius r1 is in range of about 2.5 micron to 5 micron. In another embodiment of the present disclosure, the first radius r1 is in range of about 2 micron to 3.15 micron. In yet another embodiment of the present disclosure, range of the first radius r1 of the core 102 of the optical fibre 100 may vary.

The optical fibre 100 includes the buffer clad region 104. The buffer clad region 104 concentrically surrounds the core 102 of the optical fibre 100. In an embodiment of the present disclosure, the buffer clad region 104 lies between the first radius r1 and a second radius r2 from the central longitudinal axis 112 of the optical fibre 100. The buffer clad region 104 has a second relative refractive index Δ2. In an embodiment of the present disclosure, the buffer clad region 104 has the second relative refractive index Δ2 of zero. In another embodiment of the present disclosure, the second relative refractive index Δ2 of the buffer clad region 104 may vary.

The buffer clad region 104 has the second radius r2. In an embodiment of the present disclosure, the second radius r2 is in range of about 5 micron to 7 micron. In another embodiment of the present disclosure, the second radius r2 is in range of about 3 micron to 6 micron. In yet another embodiment of the present disclosure, range of the second radius r2 may vary.

The optical fibre 100 includes the first trench region 106. In addition, the first trench region 106 concentrically surrounds the buffer clad region 104 of the optical fibre 100. The first trench region 106 has a relative refractive index Δ3. In an embodiment of the present disclosure, the relative refractive index Δ3 of the first trench region 106 is in range of about −0.25 to −0.35. In another embodiment of the present disclosure, the relative refractive index Δ3 of the first trench region 106 is in range of about −0.3 to 0.46. In yet another embodiment of the present disclosure, range of the relative refractive index Δ3 of the first trench region 106 may vary.

In an embodiment of the present disclosure, the first trench region 106 has a first alpha αtrench-1 in range of about 3 to 6. In another embodiment of the present disclosure, the first trench region 106 has the first alpha αtrench-1 in range of 1.5 to 2. In yet another embodiment of the present disclosure, range of the first alpha αtrench-1 of the first trench region 106 may vary.

The first trench region 106 has a third radius r3. The third radius r3 is in range of at least one of 12 micron to 16 micron and 12 micron to 20 micron. In another embodiment of the present disclosure, range of the third radius r3 may vary.

The optical fibre 100 includes the second trench region 108. In addition, the second trench region 108 lies between the third radius r3 and a fourth radius r4. Further, the second trench region 108 concentrically surrounds the first trench region 106 of the optical fibre 100. Furthermore, the second trench region 108 has a relative refractive index Δ4. In an embodiment of the present disclosure, the second trench region 108 has the relative refractive index Δ4 in range of about −0.4 to −0.55. In another embodiment of the present disclosure, the second trench region 108 has the relative refractive index Δ4 in range of about −0.41 to −0.57. In yet another embodiment of the present disclosure, range of the relative refractive index Δ4 of the second trench region 100 may vary.

In addition, the second trench region 108 has a second alpha $\alpha_{trench-2}$. In an embodiment of the present disclosure, second trench region 108 has the second alpha α in range of about 3 to 6. In another embodiment of the present disclosure, the second trench region 108 has the second alpha $\alpha_{trench-2}$ in range of about 5 to 9. In yet another embodiment of the present disclosure, range of the second alpha $\alpha_{trench-2}$ of the second trench region 108 may vary.

The second trench region 108 has the fourth radius r4. The fourth radius r4 is in range of at least one of 24 micron to 28 micron and 26 micron to 30 micron. In an embodiment of the present disclosure, range of the fourth radius r4 may vary.

The optical fibre 100 includes the cladding region 110. The cladding region 110 concentrically surrounds the second trench region 108 of the optical fibre 100. In addition, the cladding region 110 lies between the fourth radius r4 and a fifth radius r5. Further, the cladding region 110 has a third relative refractive index Δ5. In an embodiment of the present disclosure, the cladding region 110 has the third relative refractive index Δ5 of about zero. In another embodiment of the present disclosure, the third relative refractive index Δ5 of the cladding region 110 may vary.

The cladding region 110 has the fifth radius r5. In an embodiment of the present disclosure, the fifth radius r5 is about 62.5 micron. In another embodiment of the present disclosure, the fifth radius r5 may vary.

The optical fibre 100 has gradual variation in core and trench regions of refractive index profile. In addition, gradual variation means that there is no sharp change in the refractive index profile of the optical fibre 100.

In an embodiment of the present disclosure, the core 102 of the optical fibre 100 has maximum refractive index $n_{max}$. The buffer clad region 104 has refractive index of pure silica $n_{clad}$. The first trench region 106 has minimum refractive index ntrench-1. In addition, ntrench-1 is minimum refractive index of the first trench region 106. The second trench region 108 has minimum refractive index ntrench-2. In addition, ntrench-2 is minimum refractive index of the second trench region 108. Furthermore, expressions used to determine refractive index is given below:

$$n(r) = n_{max}\left[1 - 2\Delta 1\left(\frac{r}{r1}\right)^\alpha\right]^{0.5}$$

for $r \leq r_1$ $$n(r) = n_{clad}$$

for $r_1 \leq r < r_2$ and $r \geq r_4$ $$n(r) = n_{clad} - n_{trench-1}\left[1 + 2\Delta 3\left(\frac{(r3-r)}{(r3-r2)}\right)^{\alpha_{trench}-1}\right]^{0.5}$$

for $r_2 \leq r \leq r_3$ $$n(r) = n_{trench-1} - n_{trench-2}\left[1 + 2\Delta 4\left(\frac{(r4-r)}{(r4-r3)}\right)^{\alpha_{trench\_2}}\right]^{0.5}$$

for $r_3 \leq r < r_4$

In an embodiment of the present disclosure, the refractive index profile of the optical fibre 100 provides high optical signal to noise ratio, low non-linear effects, low latency and low attenuation. The optical fibre 100 has attenuation of less than or equal to 0.17 dB/km at a wavelength of 1550 nanometer. Further, the optical fibre 100 has large mode field diameter and large effective area. The optical fibre 100 has a mode field diameter in a range of about 12 micron to 13 micron.

The optical fibre 100 has a mode field diameter. In an embodiment of the present disclosure, the mode field diameter of the optical fibre 100 is in range of about 12 micron to 13 micron at wavelength of 1550 nanometer. In another embodiment of the present disclosure, range of the mode field diameter of the optical fibre 100 may vary.

In addition, the optical fibre 100 has a cable cut off wavelength. In an embodiment of the present disclosure, the cable cut off wavelength of the optical fibre 100 is up to 1530 nanometer. In another embodiment of the present disclosure, the cable cut off wavelength of the optical fibre 100 may vary.

Further, the optical fibre 100 has a zero dispersion wavelength. In an embodiment of the present disclosure, the zero dispersion wavelength of the optical fibre 100 is in range of about 1260 nanometer to 1290 nanometer. In another embodiment of the present disclosure, the zero dispersion wavelength of the optical fibre 100 may vary.

Furthermore, the optical fibre 100 has dispersion. In an embodiment of the present disclosure, the dispersion of the optical fibre 100 is in range of about 17 picosecond/(nanometer-kilometer) to 23 picosecond/(nanometer-kilometer) corresponding to wavelength of 1550 nanometer. In another embodiment of the present disclosure, the dispersion of the optical fibre 100 corresponding to wavelength of 1550 nanometer may vary.

In an embodiment of the present disclosure, the dispersion of the optical fibre 100 is up to 27 picosecond/(nanometer-kilometer) corresponding to wavelength of 1625 nanometer. In another embodiment of the present disclosure, the dispersion of the optical fibre 100 corresponding to wavelength of 1625 nanometer may vary.

Also, the optical fibre 100 has a low macro-bend loss. In an embodiment of the present disclosure, the macro-bend loss of the optical fibre 100 is up to 0.1 decibel per 100 turns corresponding to wavelength of 1550 nanometer. In addition, the macro-bend loss occurs at bending radius of about 30 millimeter. In yet another embodiment of the present disclosure, the macro-bend loss corresponding to wavelength of 1550 nanometer of the optical fibre 100 may vary.

In an embodiment of the present disclosure, the macro-bend loss of the optical fibre 100 is up to 0.1 decibel per 100 turns corresponding to wavelength of 1625 nanometer. In addition, the macro-bend loss occurs at bending radius of about 30 millimeter. In another embodiment of the present disclosure, the macro-bend loss corresponding to wavelength of 1625 nanometer of the optical fibre 100 may vary.

In an embodiment of the present disclosure, the optical fibre 100 has the first radius r1 of about 4.9 micron. In addition, the optical fibre 100 has the second radius r2 of about 6.2 micron. Further, the optical fibre 100 has the third radius r3 of about 12 micron. Furthermore, the optical fibre 100 has the fourth radius r4 of about 25 micron. Moreover, the optical fibre 100 has the fifth radius r5 of about 62.5 micron. In addition, the core 102 of the optical fibre 100 has the first relative refractive index $\Delta 1$ of about 0.12. In addition, the buffer clad region 104 of the optical fibre 100 has the second relative refractive index $\Delta 2$ of about zero. Further, the first trench region 106 of the optical fibre 100 has the relative refractive index $\Delta 3$ of about −0.3. Furthermore, the second trench region 108 of the optical fibre 100 has the relative refractive index $\Delta 4$ of about −0.43. Moreover, the cladding region 110 of the optical fibre 100 has the third relative refractive index $\Delta 5$ of about zero. Further, the core 102 of the optical fibre 100 has the profile shape parameter alpha $\alpha$ of about 8. In addition, the first trench region of optical fibre 100 has the first alpha $\alpha_{trench-1}$ of about 4. Further, the second trench region of optical fibre 100 has the second alpha $\alpha_{trench-2}$ of about 3. Furthermore, the optical fibre 100 has the mode field diameter of about 12 micron at wavelength of 1550 nanometer. Moreover, the optical fibre 100 has the zero dispersion wavelength of about 1271 nanometer. Also, the optical fibre 100 has the dispersion of about 21.5 picosecond/(nanometer-kilometer) at wavelength of 1550 nanometer. In addition, the optical fibre 100 has the dispersion of about 26 picosecond/(nanometer-kilometer) at wavelength 1625 nanometer. Further, the optical fibre 100 has the cable cut off wavelength of about 1480 nanometer. Furthermore, the optical fibre 100 has the macro-bend loss of about 0.01 decibel per 100 turn corresponding to wavelength of 1550 nanometer at bending radius of 30 millimeter. Moreover, the macro-bend loss is about 0.045 decibel per 100 turns corresponding to wavelength of about 1625 nanometer at bending radius of 30 millimeter.

In another embodiment of the present disclosure, the optical fibre 100 has the first radius r1 of about 2.5 micron. In addition, the optical fibre 100 has the second radius r2 of about 5.4 micron. Further, the optical fibre 100 has the third radius r3 of about 12 micron. Furthermore, the optical fibre 100 has the fourth radius r4 of about 28 micron. Moreover, the optical fibre 100 has the fifth radius r5 of about 62.5 micron. In addition, the core 102 of the optical fibre 100 has the first relative refractive index $\Delta 1$ of about 0.1. Further, the buffer clad region 104 of the optical fibre 100 has the second relative refractive index $\Delta 2$ of about zero. Furthermore, the first trench region 106 of the optical fibre 100 has the relative refractive index $\Delta 3$ of about −0.28. Moreover, the second trench region 108 of the optical fibre 100 has the relative refractive index $\Delta 4$ of about −0.4. Also, the cladding region 110 of the optical fibre 100 has the third relative refractive index $\Delta 5$ of about zero. Further, the core 102 of the optical fibre 100 has the profile shape parameter alpha $\alpha$ of about 7. In addition, the first trench region of optical fibre 100 has the first alpha $\alpha_{trench-1}$ of about 4. Further, the second trench region of optical fibre 100 has the second alpha $\alpha_{trench-2}$ of about 5. Furthermore, the optical fibre 100 has the mode field diameter of about 12.5 micron at wavelength of 1550 nanometer. Moreover, the optical fibre 100 has the zero dispersion wavelength of about 1282 nanometer. Also, the optical fibre 100 has the dispersion of about 20.6 picosecond/(nanometer-kilometer) at wavelength of 1550 nanometer. In addition, the optical fibre 100 has the dispersion of about 25.1 picosecond/(nanometer-kilometer) at wavelength 1625 nanometer. Further, the optical fibre 100 has the cable cut off wavelength of about 1475 nanometer. Furthermore, the optical fibre 100 has the macro-bend loss of about 0.014 decibel per 100 turns corresponding to wavelength of 1550 nanometer at bending radius of 30 millimeter. Moreover, the macro-bend loss is about 0.045 decibel per 100 turns corresponding to wavelength of about 1625 nanometer at bending radius of 30 millimeter.

In yet another embodiment of the present disclosure, the optical fibre 100 has the first radius r1 of about 2.5 micron. In addition, the optical fibre 100 has the second radius r2 of about 5.4 micron. Further, the optical fibre 100 has the third radius r3 of about 12 micron. Furthermore, the optical fibre 100 has the fourth radius r4 of about 24.4 micron. Moreover, the optical fibre 100 has the fifth radius r5 of about 62.5 micron. In addition, the core 102 of the optical fibre 100 has the first relative refractive index $\Delta 1$ of about 0.1. Further, the buffer clad region 104 of the optical fibre 100 has the second relative refractive index Δ2 of about zero. Furthermore, the first trench region 106 of the optical fibre 100 has the relative refractive index Δ3 of about −0.28. Moreover, the second trench region 108 of the optical fibre 100 has the relative refractive index Δ4 of about −0.53. Also, the cladding region 110 of the optical fibre 100 has the third relative refractive index Δ5 of about zero. Further, the core region of optical fibre 100 has the profile shape parameter alpha α of about 5, the first trench region has first alpha $α_{trench-1}$ of about 3 and the second trench region has second alpha $α_{trench-2}$ of about 3. Furthermore, the optical fibre 100 has the mode field diameter of about 12.2 micron at wavelength of 1550 nanometer. Moreover, the optical fibre 100 has the zero dispersion wavelength of about 1280 nanometer. Also, the optical fibre 100 has the dispersion of about 20.65 picosecond/(nanometer-kilometer) at wavelength of 1550 nanometer. In addition, the optical fibre 100 has the dispersion of about 25.32 picosecond/(nanometer-kilometer) at wavelength 1625 nanometer. Further, the optical fibre 100 has the cable cut off wavelength of about 1480 nanometer. Furthermore, the optical fibre 100 has the macro-bend loss of about 0.012 decibel per 100 turn corresponding to wavelength of 1550 nanometer at bending radius of 30 millimeter. Moreover, the macro-bend loss is about 0.04 decibel per 100 turn corresponding to wavelength of about 1625 nanometer at bending radius of 30 millimeter.

In yet another embodiment of the present disclosure, the optical fibre 100 has the first radius r1 of about 3.01 micron. In addition, the optical fibre 100 has the second radius r2 of about 6.12 micron. Further, the optical fibre 100 has the third radius r3 of about 13.687 micron. Furthermore, the optical fibre 100 has the fourth radius r4 of about 26.26 micron. Moreover, the optical fibre 100 has the fifth radius r5 of about 62.5 micron. In addition, the core 102 of the optical fibre 100 has the first relative refractive index Δ1 of about 0.1. Further, the buffer clad region 104 of the optical fibre 100 has the second relative refractive index Δ2 of about zero. Furthermore, the first trench region 106 of the optical fibre 100 has the relative refractive index Δ3 of about −0.34. Moreover, the second trench region 108 of the optical fibre 100 has the relative refractive index Δ4 of about −0.44. Also, the cladding region 110 of the optical fibre 100 has the third relative refractive index Δ5 of about zero. Further, the core region of optical fibre 100 has the profile shape parameter alpha α of about 8. In addition, the first trench region of optical fibre 100 has the first alpha $α_{trench-1}$ of about 4. Further, the second trench region of optical fibre 100 has the first alpha $α_{trench-2}$ of about 4. Furthermore, the optical fibre 100 has the mode field diameter of about 12.26 micron at wavelength of 1550 nanometer. Moreover, the optical fibre 100 has the zero dispersion wavelength of about 1277 nanometer. Also, the optical fibre 100 has the dispersion of about 21.5 picosecond/(nanometer-kilometer) at wavelength of 1550 nanometer. In addition, the optical fibre 100 has the dispersion of about 25.8 picosecond/(nanometer-kilometer) at wavelength 1625 nanometer. Further, the optical fibre 100 has the cable cut off wavelength of about 1520 nanometer. Furthermore, the optical fibre 100 has the macro-bend loss of about 0.03 decibel per 100 turns corresponding to wavelength of 1550 nanometer at bending radius of 30 millimeter. Moreover, the macro-bend loss is about 0.08 decibel per 100 turns corresponding to wavelength of about 1625 nanometer at bending radius of 30 millimeter.

In yet another embodiment of the present disclosure, the optical fibre 100 has the first radius r1 of about 3.05 micron. In addition, the optical fibre 100 has the second radius r2 of about 6.405 micron. Further, the optical fibre 100 has the third radius r3 of about 14.22 micron. Furthermore, the optical fibre 100 has the fourth radius r4 of about 26.0226 micron. Moreover, the optical fibre 100 has the fifth radius r5 of about 62.5 micron. In addition, the core 102 of the optical fibre 100 has the first relative refractive index Δ1 of about 0.1. Further, the buffer clad region 104 of the optical fibre 100 has the second relative refractive index Δ2 of about zero. Furthermore, the first trench region 106 of the optical fibre 100 has the relative refractive index Δ3 of about −0.34. Moreover, the second trench region 108 of the optical fibre 100 has the relative refractive index Δ4 of about −0.42. Also, the cladding region 110 of the optical fibre 100 has the third relative refractive index Δ5 of about zero. Further, the core region optical fibre 100 has the profile shape parameter alpha α of about 6. In addition, the first trench region optical fibre 100 has the first alpha $α_{trench-1}$ of about 5. Further, the second trench region optical fibre 100 has the second alpha $α_{trench-2}$ of about 3. Furthermore, the optical fibre 100 has the mode field diameter of about 12.56 micron at wavelength of 1550 nanometer. Moreover, the optical fibre 100 has the zero dispersion wavelength of about 1276 nanometer. Also, the optical fibre 100 has the dispersion of about 21.6 picosecond/(nanometer-kilometer) at wavelength of 1550 nanometer. In addition, the optical fibre 100 has the dispersion of about 26 picosecond/(nanometer-kilometer) at wavelength 1625 nanometer. Further, the optical fibre 100 has the cable cut off wavelength of about 1520 nanometer. Furthermore, the optical fibre 100 has the macro-bend loss of about 0.038 decibel Per 100 turns corresponding to wavelength of 1550 nanometer at bending radius of 30 millimeter. Moreover, the macro-bend loss is about 0.09 decibel per 100 turns corresponding to wavelength of about 1625 nanometer at bending radius of 30 millimeter.

In yet another embodiment of the present disclosure, the optical fibre 100 has the first radius r1 of about 2.62 micron. In addition, the optical fibre 100 has the second radius r2 of about 3.8 micron. Further, the optical fibre 100 has the third radius r3 of about 14 micron. Furthermore, the optical fibre 100 has the fourth radius r4 of about 27.7 micron. Moreover, the optical fibre 100 has the fifth radius r5 of about 62.5 micron. In addition, the core 102 of the optical fibre 100 has the first relative refractive index Δ1 of about 0.1. Further, the buffer clad region 104 of the optical fibre 100 has the second relative refractive index Δ2 of about zero. Furthermore, the first trench region 106 of the optical fibre 100 has the relative refractive index Δ3 of about −0.33. Moreover, the second trench region 108 of the optical fibre 100 has the relative refractive index Δ4 of about −15 0.42. Also, the cladding region 110 of the optical fibre 100 has the third relative refractive index Δ5 of about zero. Further, the core region optical fibre 100 has the profile shape parameter alpha α of about 6. In addition, the first trench region optical fibre 100 has the first alpha $α_{trench-1}$ of about 1.5. Further, the second trench region optical fibre 100 has the second alpha $α_{trench-2}$ of about 7. Furthermore, the optical fibre 100 has the mode field diameter of about 12.47 micron at wavelength of 1550 nanometer. Moreover, the optical fibre 100 has the zero dispersion wavelength of about 1293 nanometer. Also, the optical fibre 100 has the dispersion of about 19.9 picosecond/(nanometer-kilometer) at wavelength of 1550 nanometer. In addition, the optical fibre 100 has the dispersion of about 24.5 picosecond/(nanometer-kilometer) at wavelength 1625 nanometer. Further, the optical fibre 100 has the cable cut off wavelength of about 1500 nanometer. Furthermore, the optical fibre 100 has the macro-bend loss of about 0.026 decibel per 100 turns corresponding to wavelength of 1550 nanometer at bending radius of 30 millimeter. Moreover, the macro-bend loss is about 0.08 decibel per 100 turns corresponding to wavelength of about 1625 nanometer at bending radius of 30 millimeter.

In yet another embodiment of the present disclosure, the optical fibre 100 has the first radius r1 of about 2.5 micron. In addition, the optical fibre 100 has the second radius r2 of about 3.8 micron. Further, the optical fibre 100 has the third radius r3 of about 14 micron. Furthermore, the optical fibre 100 has the fourth radius r4 of about 27.7 micron. Moreover, the optical fibre 100 has the fifth radius r5 of about 62.5 micron. In addition, the core 102 of the optical fibre 100 has the first relative refractive index Δ1 of about 0.1. Further, the buffer clad region 104 of the optical fibre 100 has the second relative refractive index Δ2 of about zero. Furthermore, the first trench region 106 of the optical fibre 100 has the relative refractive index Δ3 of about −0.33. Moreover, the second trench region 108 of the optical fibre 100 has the relative refractive index Δ4 of about −0.42. Also, the cladding region 110 of the optical fibre 100 has the third relative refractive index Δ5 of about zero. Further, the core region optical fibre 100 has the profile shape parameter alpha α of about 6. In addition, the first trench region optical fibre 100 has the first alpha $\alpha_{trench-1}$ of about 1.5. Further, the second trench region optical fibre 100 has the second alpha $\alpha_{trench-2}$ of about 7. Furthermore, the optical fibre 100 has the mode field diameter of about 12.47 micron at wavelength of 1550 nanometer. Moreover, the optical fibre 100 has the zero dispersion wavelength of about 1293 nanometer. Also, the optical fibre 100 has the dispersion of about 19.9 picosecond/(nanometer-kilometer) at wavelength of 1550 nanometer. In addition, the optical fibre 100 has the dispersion of about 24.5 picosecond/(nanometer-kilometer) at wavelength 1625 nanometer. Further, the optical fibre 100 has the cable cut off wavelength of about 1510 nanometer. Furthermore, the optical fibre 100 has the macro-bend loss of about 0.02 decibel per 100 turns corresponding to wavelength of 1550 nanometer at bending radius of 30 millimeter. Moreover, the macro-bend loss is about 0.08 decibel per 100 turns corresponding to wavelength of about 1625 nanometer at bending radius of 30 millimeter.

In yet another embodiment of the present disclosure, the optical fibre 100 has the first radius r1 of about 2.55 micron. In addition, the optical fibre 100 has the second radius r2 of about 3.85 micron. Further, the optical fibre 100 has the third radius r3 of about 14.5 micron. Furthermore, the optical fibre 100 has the fourth radius r4 of about 27.85 micron. Moreover, the optical fibre 100 has the fifth radius r5 of about 62.5 micron. In addition, the core 102 of the optical fibre 100 has the first relative refractive index Δ1 of about 0.1. Further, the buffer clad region 104 of the optical fibre 100 has the second relative refractive index Δ2 of about zero. Furthermore, the first trench region 106 of the optical fibre 100 has the relative refractive index Δ3 of about −0.34. Moreover, the second trench region 108 of the optical fibre 100 has the relative refractive index Δ4 of about −0.42. Also, the cladding region 110 of the optical fibre 100 has the third relative refractive index Δ5 of about zero. Further, the core region optical fibre 100 has the profile shape parameter alpha α of about 6. In addition, the first trench region optical fibre 100 has the first alpha αtrench-1 of about 1.5. Further, the second trench region optical fibre 100 has the second alpha $\alpha_{trench-2}$ of about 8. Furthermore, the optical fibre 100 has the mode field diameter of about 12.58 micron at wavelength of 1550 nanometer. Moreover, the optical fibre 100 has the zero dispersion wavelength of about 1293 nanometer. Also, the optical fibre 100 has the dispersion of about 19.9 picosecond/(nanometer-kilometer) at wavelength of 1550 nanometer. In addition, the optical fibre 100 has the dispersion of about 24.5 picosecond/(nanometer-kilometer) at wavelength 1625 nanometer. Further, the optical fibre 100 has the cable cut off wavelength of about 1525 nanometer. Furthermore, the optical fibre 100 has the macro-bend loss of about 0.026 decibel per 100 turns corresponding to wavelength of 1550 nanometer at bending radius of 30 millimeter. Moreover, the macro-bend loss is about 0.07 decibel per 100 turns corresponding to wavelength of about 1625 nanometer at bending radius of 30 millimeter.

In yet another embodiment of the present disclosure, the optical fibre 100 has the first radius r1 of about 2.5 micron. In addition, the optical fibre 100 has the second radius r2 of about 3.8 micron. Further, the optical fibre 100 has the third radius r3 of about 14 micron. Furthermore, the optical fibre 100 has the fourth radius r4 of about 27 micron. Moreover, the optical fibre 100 has the fifth radius r5 of about 62.5 micron. In addition, the core 102 of the optical fibre 100 has the first relative refractive index Δ1 of about 0.1. Further, the buffer clad region 104 of the optical fibre 100 has the second relative refractive index Δ2 of about zero. Furthermore, the first trench region 106 of the optical fibre 100 has the relative refractive index Δ3 of about −0.34. Moreover, the second trench region 108 of the optical fibre 100 has the relative refractive index Δ4 of about −0.42. Also, the cladding region 110 of the optical fibre 100 has the third relative refractive index Δ5 of about zero. Further, the core region optical fibre 100 has the profile shape parameter alpha α of about 6. In addition, the first trench region optical fibre 100 has the first alpha $\alpha_{trench-1}$ of about 1.5. Further, the second trench region optical fibre 100 has the second alpha $\alpha_{trench-2}$ of about 8. Furthermore, the optical fibre 100 has the mode field diameter of about 12.47 micron at wavelength of 1550 nanometer. Moreover, the optical fibre 100 has the zero dispersion wavelength of about 1293 nanometer. Also, the optical fibre 100 has the dispersion of about 19.9 picosecond/(nanometer-kilometer) at wavelength of 1550 nanometer. In addition, the optical fibre 100 has the dispersion of about 24.5 picosecond/(nanometer-kilometer) at wavelength 1625 nanometer. Further, the optical fibre 100 has the cable cut off wavelength of about 1500 nanometer. Furthermore, the optical fibre 100 has the macro-bend loss of about 0.04 decibel per 100 turns corresponding to wavelength of 1550 nanometer at bending radius of 30 millimeter. Moreover, the macro-bend loss is about 0.093 decibel per 100 turns corresponding to wavelength of about 1625 nanometer at bending radius of 30 millimeter.

In yet another embodiment of the present disclosure, the optical fibre 100 has the first radius r1 of about 2.5 micron. In addition, the optical fibre 100 has the second radius r2 of about 3.8 micron. Further, the optical fibre 100 has the third radius r3 of about 14 micron. Furthermore, the optical fibre 100 has the fourth radius r4 of about 27.7 micron. Moreover, the optical fibre 100 has the fifth radius r5 of about 62.5 micron. In addition, the core 102 of the optical fibre 100 has the first relative refractive index Δ1 of about 0.1. Further, the buffer clad region 104 of the optical fibre 100 has the second relative refractive index Δ2 of about zero. Furthermore, the first trench region 106 of the optical fibre 100 has the relative refractive index Δ3 of about −0.34. Moreover, the second trench region 108 of the optical fibre 100 has the relative refractive index Δ4 of about −0.42. Also, the cladding region 110 of the optical fibre 100 has the third relative refractive index Δ5 of about zero. Further, the core region optical fibre 100 has the profile shape parameter alpha α of about 6. In addition, the first trench region optical fibre 100 has the first alpha $\alpha_{trench-1}$ of about 1.5. Further, the second trench region optical fibre 100 has the second alpha $\alpha_{trench-2}$ of about 7. Furthermore, the optical fibre 100 has the mode field diameter of about 12.47 micron at wavelength of 1550 nanometer. Moreover, the optical fibre 100 has the zero dispersion wavelength of about 1293 nanometer. Also, the optical fibre 100 has the dispersion of about 19.9 picosecond/(nanometer-kilometer) at wavelength of 1550 nanometer. In addition, the optical fibre 100 has the dispersion of about 24.5 picosecond/(nanometer-kilometer) at wavelength 1625 nanometer. Further, the optical fibre 100 has the cable cut off wavelength of about 1510 nanometer. Furthermore, the optical fibre 100 has the macro-bend loss of about 0.02 decibel per 100 turns corresponding to wavelength of 1550 nanometer at bending radius of 30 millimeter. Moreover, the macro-bend loss is about 0.08 decibel per 100 turns corresponding to wavelength of about 1625 nanometer at bending radius of 30 millimeter.

In yet another embodiment of the present disclosure, the optical fibre 100 has the first radius r1 of about 2.62 micron. In addition, the optical fibre 100 has the second radius r2 of about 3.8 micron. Further, the optical fibre 100 has the third radius r3 of about 14 micron. Furthermore, the optical fibre 100 has the fourth radius r4 of about 27.7 micron. Moreover, the optical fibre 100 has the fifth radius r5 of about 62.5 micron. In addition, the core 102 of the optical fibre 100 has the first relative refractive index $\Delta 1$ of about 0.1. Further, the buffer clad region 104 of the optical fibre 100 has the second relative refractive index $\Delta 2$ of about zero. Furthermore, the first trench region 106 of the optical fibre 100 has the relative refractive index $\Delta 3$ of about −0.32. Moreover, the second trench region 108 of the optical fibre 100 has the relative refractive index $\Delta 4$ of about −0.42. Also, the cladding region 110 of the optical fibre 100 has the third relative refractive index $\Delta 5$ of about zero. Further, the core region optical fibre 100 has the profile shape parameter alpha $\alpha$ of about 6. In addition, the first trench region optical fibre 100 has the first alpha $\alpha_{trench-1}$ of about 1.5. Further, the second trench region optical fibre 100 has the second alpha $\alpha_{trench-2}$ of about 7. Furthermore, the optical fibre 100 has the mode field diameter of about 12.58 micron at wavelength of 1550 nanometer. Moreover, the optical fibre 100 has the zero dispersion wavelength of about 1294 nanometer. Also, the optical fibre 100 15 has the dispersion of about 19.9 picosecond/(nanometer-kilometer) at wavelength of 1550 nanometer. In addition, the optical fibre 100 has the dispersion of about 24.16 picosecond/(nanometer-kilometer) at wavelength 1625 nanometer. Further, the optical fibre 100 has the cable cut off wavelength of about 1510 nanometer. Furthermore, the optical fibre 100 has the macro-bend loss of about 0.03 decibel per 100 turns corresponding to wavelength of 1550 nanometer at bending radius of 30 millimeter. Moreover, the macro-bend loss is about 0.08 decibel per 100 turns corresponding to wavelength of about 1625 nanometer at bending radius of 30 millimeter.

In yet another embodiment of the present disclosure, the optical fibre 100 has the first radius r1 of about 3.1 micron. In addition, the optical fibre 100 has the second radius r2 of about 5.9 micron. Further, the optical fibre 100 has the third radius r3 of about 18 micron. Furthermore, the optical fibre 100 has the fourth radius r4 of about 27 micron. Moreover, the optical fibre 100 has the fifth radius r5 of about 62.5 micron. In addition, the core 102 of the optical fibre 100 has the first relative refractive index $\Delta 1$ of about 0.1. Further, the buffer clad region 104 of the optical fibre 100 has the second relative refractive index $\Delta 2$ of about zero. Furthermore, the first trench region 106 of the optical fibre 100 has the relative refractive index $\Delta 3$ of about −0.34. Moreover, the second trench region 108 of the optical fibre 100 has the relative refractive index $\Delta 4$ of about −0.42. Also, the cladding region 110 of the optical fibre 100 has the third relative refractive index $\Delta 5$ of about zero. Further, the core region optical fibre 100 has the profile shape parameter alpha $\alpha$ of about 8. In addition, the first trench region optical fibre 100 has the first alpha $\alpha_{trench-1}$ of about 2. Further, the second trench region optical fibre 100 has the second alpha $\alpha_{trench-2}$ of about 6. Furthermore, the optical fibre 100 has the mode field diameter of about 13 micron at wavelength of 1550 nanometer. Moreover, the optical fibre 100 has the zero dispersion wavelength of about 1285 nanometer. Also, the optical fibre 100 has the dispersion of about 21.1 picosecond/(nanometer-kilometer) at wavelength of 1550 nanometer. In addition, the optical fibre 100 has the dispersion of about 25.4 picosecond/(nanometer-kilometer) at wavelength 1625 nanometer. Further, the optical fibre 100 has the cable cut off wavelength of about 1530 nanometer. Furthermore, the optical fibre 100 has the macro-bend loss of about 0.053 decibel per 100 turns corresponding to wavelength of 1550 nanometer at bending radius of 30 millimeter. Moreover, the macro-bend loss is about 0.1 decibel per 100 turns corresponding to wavelength of about 1625 nanometer at bending radius of 30 millimeter.

In yet another embodiment of the present disclosure, the optical fibre 100 has the first radius r1 of about 2.1 micron. In addition, the optical fibre 100 has the second radius r2 of about 3.2 micron. Further, the optical fibre 100 has the third radius r3 of about 18 micron. Furthermore, the optical fibre 100 has the fourth radius r4 of about 26.2 micron. Moreover, the optical fibre 100 has the fifth radius r5 of about 62.5 micron. In addition, the core 102 of the optical fibre 100 has the first relative refractive index $\Delta 1$ of about 0.05. Further, the buffer clad region 104 of the optical fibre 100 has the second relative refractive index $\Delta 2$ of about zero. Furthermore, the first trench region 106 of the optical fibre 100 has the relative refractive index $\Delta 3$ of about −0.45. Moreover, the second trench region 108 of the optical fibre 100 has the relative refractive index $\Delta 4$ of about −0.53. Also, the cladding region 110 of the optical fibre 100 has the third relative refractive index $\Delta 5$ of about zero. Further, the core region optical fibre 100 has the profile shape parameter alpha $\alpha$ of about 8. In addition, the first trench region optical fibre 100 has the first alpha $\alpha_{trench-1}$ of about 2. Further, the second trench region optical fibre 100 has the second alpha $\alpha_{trench-2}$ of about 7. Furthermore, the optical fibre 100 has the mode field diameter of about 12.2 micron at wavelength of 1550 nanometer. Moreover, the optical fibre 100 has the zero dispersion wavelength of about 1287 nanometer. Also, the optical fibre 100 has the dispersion of about 20.1 picosecond/(nanometer-kilometer) at wavelength of 1550 nanometer. In addition, the optical fibre 100 has the dispersion of about 24 picosecond/(nanometer-kilometer) at wavelength 1625 nanometer. Further, the optical fibre 100 has the cable cut off wavelength of about 1520 nanometer. Furthermore, the optical fibre 100 has the macro-bend loss of about 0.03 decibel per 100 turns corresponding to wavelength of 1550 nanometer at bending radius of 30 millimeter. Moreover, the macro-bend loss is about 0.07 decibel per 100 turns corresponding to wavelength of about 1625 nanometer at bending radius of 30 millimeter.

In yet another embodiment of the present disclosure, the optical fibre 100 has the first radius r1 of about 2.1 micron. In addition, the optical fibre 100 has the second radius r2 of about 3.2 micron. Further, the optical fibre 100 has the third radius r3 of about 13 micron. Furthermore, the optical fibre 100 has the fourth radius r4 of about 29 micron. Moreover, the optical fibre 100 has the fifth radius r5 of about 62.5 micron. In addition, the core 102 of the optical fibre 100 has the first relative refractive index Δ1 of about 0.02. Further, the buffer clad region 104 of the optical fibre 100 has the second relative refractive index Δ2 of about zero. Furthermore, the first trench region 106 of the optical fibre 100 has the relative refractive index Δ3 of about −0.35. Moreover, the second trench region 108 of the optical fibre 100 has the relative refractive index Δ4 of about −0.53. Also, the cladding region 110 of the optical fibre 100 has the third relative refractive index Δ5 of about zero. Further, the core region optical fibre 100 has the profile shape parameter alpha α of about 7. In addition, the first trench region optical fibre 100 has the first alpha $\alpha_{trench-1}$ of about 2. Further, the second trench region optical fibre 100 has the second alpha $\alpha_{trench-2}$ of about 7. Furthermore, the optical fibre 100 has the mode field diameter of about 12.14 micron at wavelength of 1550 nanometer. Moreover, the optical fibre 100 has the zero dispersion wavelength of about 1286 nanometer. Also, the optical fibre 100 has the dispersion of about 19.9 picosecond/(nanometer-kilometer) at wavelength of 1550 nanometer. In addition, the optical fibre 100 has the dispersion of about 24.4 picosecond/(nanometer-kilometer) at wavelength 1625 nanometer. Further, the optical fibre 100 has the cable cut off wavelength of about 1485 nanometer. Furthermore, the optical fibre 100 has the macro-bend loss of about 0.023 decibel per 100 turns corresponding to wavelength of 1550 nanometer at bending radius of 30 millimeter. Moreover, the macro-bend loss is about 0.072 decibel per 100 turns corresponding to wavelength of about 1625 nanometer at bending radius of 30 millimeter.

In yet another embodiment of the present disclosure, the optical fibre 100 has the first radius r1 of about 2.1 micron. In addition, the optical fibre 100 has the second radius r2 of about 3.2 micron. Further, the optical fibre 100 has the third radius r3 of about 13 micron. Furthermore, the optical fibre 100 has the fourth radius r4 of about 29 micron. Moreover, the optical fibre 100 has the fifth radius r5 of about 62.5 micron. In addition, the core 102 of the optical fibre 100 has the first relative refractive index Δ1 of about 0.02. Further, the buffer clad region 104 of the optical fibre 100 has the second relative refractive index Δ2 of about zero. Furthermore, the first trench region 106 of the optical fibre 100 has the relative refractive index Δ3 of about −0.35. Moreover, the second trench region 108 of the optical fibre 100 has the relative refractive index Δ4 of about −0.53. Also, the cladding region 110 of the optical fibre 100 has the third relative refractive index Δ5 of about zero. Further, the core 102 of the optical fibre 100 has the profile shape parameter alpha α of about 7. In addition, the first trench region optical fibre 100 has the first alpha αtrench-1 of about 2. Further, the second trench region optical fibre 100 has the second alpha αtrench-2 of about 7. Furthermore, the optical fibre 100 has the mode field diameter of about 12.14 micron at wavelength of 1550 nanometer. Moreover, the optical fibre 100 has the zero dispersion wavelength of about 1286 nanometer. Also, the optical fibre 100 has the dispersion of about 19.9 picosecond/(nanometer-kilometer) at wavelength of 1550 nanometer. In addition, the optical fibre 100 has the dispersion of about 24.4 picosecond/(nanometer-kilometer) at wavelength 1625 nanometer. Further, the optical fibre 100 has the cable cut off wavelength of about 1485 nanometer. Furthermore, the optical fibre 100 has the macro-bend loss of about 0.023 decibel per 100 turns corresponding to wavelength of 1550 nanometer. Moreover, the macro-bend loss is about 0.072 decibel per 100 turns corresponding to wavelength of about 1625 nanometer. Also, the macro-bend loss occurs at bending radius of 30 millimeter.

In yet another embodiment of the present disclosure, the optical fibre 100 has the second radius r2 of about 3 micron. Further, the optical fibre 100 has the third radius r3 of about 13 micron. Furthermore, the optical fibre 100 has the 20 fourth radius r4 of about 29 micron. Moreover, the optical fibre 100 has the fifth radius r5 of about 62.5 micron. In addition, the core 102 of the optical fibre 100 has the first relative refractive index Δ1 of about zero. Further, the buffer clad region 104 of the optical fibre 100 has the second relative refractive index Δ2 of about zero. Furthermore, the first trench region 106 of the optical fibre 100 has the relative refractive index Δ3 of about −0.38. Moreover, the second trench region 108 of the optical fibre 100 has the relative refractive index Δ4 of about −0.56. Also, the cladding region 110 of the optical fibre 100 has the third relative refractive index Δ5 of about zero. Further, the first trench region optical fibre 100 has the first alpha $\alpha_{trench-1}$ of about 2. Further, the second trench region optical fibre 100 has the second alpha $\alpha_{trench-2}$ of about 7. Furthermore, the optical fibre 100 has the mode field diameter of about 11.9 micron at wavelength of 1550 nanometer. Moreover, the optical fibre 100 has the zero dispersion wavelength of about 1286 nanometer. Also, the optical fibre 100 has the dispersion of about 20 picosecond/(nanometer-kilometer) at wavelength of 1550 nanometer. In addition, the optical fibre 100 has the dispersion of about 24.4 picosecond/(nanometer-kilometer) at wavelength 1625 nanometer. Further, the optical fibre 100 has the cable cut off wavelength of about 1520 nanometer. Furthermore, the optical fibre 100 has the macro-bend loss of about 0.013 decibel per 100 turns corresponding to wavelength of 1550 nanometer. Moreover, the macro-bend loss is about 0.038 decibel per 100 turns corresponding to wavelength of about 1625 nanometer. Also, the macro-bend loss occurs at bending radius of 30 millimeter.

FIG. 2 illustrates a refractive index profile 200 of the optical fibre 100, in accordance with various embodiments of the present disclosure. The refractive index profile 200 illustrates relationship between the refractive index of 15 the optical fibre 100 and radius of the optical fibre 100 (as shown in FIG. 1).

The present disclosure provides numerous advantages over the prior art. The present disclosure provides the optical fibre with large effective area. In addition, the optical fibre has large mode field diameter. Further, the optical fibre has low macro-bend loss. Furthermore, the optical fibre has low non-linear effects. Moreover, the optical fibre has low attenuation. Also, the optical fibre has low latency. In addition, the optical fibre has high optical signal to noise ratio.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. An optical fibre comprising:
   a core, wherein the core has a first relative refractive index $\Delta 1$, wherein the first relative refractive index $\Delta 1$ of the core is in a range of 0 to 0.12;
   a first trench region, wherein the first trench region has a relative refractive index $\Delta 3$, wherein the first trench region has a first alpha $\alpha_{trench-1}$;
   a second trench region, wherein the second trench region is adjacent to the first trench region, wherein the second trench region has a relative refractive index $\Delta_4$, wherein the second trench region has a second alpha $\alpha_{trench-2}$; and
   a cladding region, wherein the cladding region surrounds the second trench region, wherein the cladding region has a third relative refractive index $\Delta 5$ of 0,
   wherein the optical fibre has attenuation of less than or equal to 0.17 dB/km at a wavelength of 1550 nanometer, wherein the optical fibre has a mode field diameter in a range of 12 microns to 13 microns,
   wherein the optical fibre has gradual variation in core and trench regions of refractive index profile.

2. The optical fibre as claimed in claim 1, wherein the optical fibre has at least one of macrobend loss up to 0.1 decibel per 100 turns corresponding to wavelength of 1550 nanometer at bending radius of 30 millimeter and macrobend loss up to 0.1 decibel per 100 turns corresponding to wavelength of 1625 nanometer at bending radius of 30 millimeter.

3. The optical fibre as claimed in claim 1, wherein the optical fibre has chromatic dispersion in range of 17 pico second per nanometer-kilometer to 23 pico second per nanometer-kilometer at wavelength of 1550 nanometer, wherein the optical fibre has a cable cut off wavelength up to 1530 nanometer.

4. The optical fibre as claimed in claim 1, further comprising a buffer clad region, wherein the buffer clad region has a second relative refractive index $\Delta 2$, wherein the buffer clad region separates the core and the first trench region.

5. The optical fibre as claimed in claim 1, wherein the core has a first radius $r_1$, wherein the first radius r1 is in range of at least one of 2.5 micron to 5 micron and 2 microns to 3.15 microns.

6. The optical fibre as claimed in claim 1, further comprising a buffer clad region, wherein the buffer clad region has a second radius r2, wherein the second radius r2 is in range of at least one of 5 microns to 7 microns and 3 microns to 6 microns, wherein the buffer clad region has a second relative refractive index $\Delta 2$ of 0.

7. The optical fibre as claimed in claim 1, wherein the cladding region has a fifth radius r5, wherein the fifth radius r5 is 62.5 microns.

8. The optical fibre as claimed in claim 1, wherein the first trench region has a third radius r3, wherein the third radius r3 is in range of at least one of 12 micron to 16 microns and 12 microns to 20 microns, wherein the relative refractive index $\Delta 3$ is in range of at least one of −0.25 to −0.35 and −0.3 to −0.46, wherein the first alpha $\alpha_{trench-1}$ of the first trench region is in a range of at least one of 3 to 6 and 1.5 to 2.

9. The optical fibre as claimed in claim 1, wherein the second trench region has a fourth radius r4, wherein the fourth radius r4 is in range of at least one of 24 microns to 28 microns and 26 microns to 30 microns, wherein the relative refractive index $\Delta 4$ is in range of at least one of −0.4 to −0.55 and −0.41 to −0.57, wherein the second alpha $\alpha_{trench-2}$ of the second trench region is in a range of at least one of 3 to 6 and 5 to 9.

10. An optical fibre comprising:
    a core, wherein the core has a first relative refractive index $\Delta 1$, wherein the first relative refractive index $\Delta 1$ of the core is in a range of 0 to 0.12;
    a first trench region, wherein the first trench region has a relative refractive index $\Delta 3$, wherein first trench region has a first alpha $\alpha_{trench-1}$;
    a second trench region, wherein the second trench region is adjacent to the first trench region, wherein the second trench region has a relative refractive index $\Delta 4$, wherein the second trench region has a second alpha $\alpha_{trench-2}$, wherein an absolute value of the relative refractive index $\Delta 4$ is greater than an absolute value of the relative refractive index $\Delta 3$; and
    a cladding region, wherein the cladding region surrounds the second trench region, wherein the cladding region has a third relative refractive index $\Delta 5$ of 0,
    wherein the optical fibre has attenuation of less than or equal to 0.17 dB/km at a wavelength of 1550 nanometer, wherein the optical fibre has a mode field diameter in a range of 12 microns to 13 microns, wherein the optical fibre has gradual variation in core and trench regions of refractive index profile.

11. The optical fibre as claimed in claim 10, wherein the optical fibre has at least one of macrobend loss up to 0.1 decibel per 100 turns corresponding to wavelength of 1550 nanometer at bending radius of 30 millimeter and macrobend loss up to 0.1 decibel per 100 turns corresponding to wavelength of 1625 nanometer at bending radius of 30 millimeter.

12. The optical fibre as claimed in claim 10, wherein the optical fibre has chromatic dispersion in range of 17 pico second per nanometer-kilometer to 23 pico second per nanometer-kilometer at wavelength of 1550 nanometer, wherein the optical fibre has a cable cut off wavelength up to 1530 nanometer.

13. The optical fibre as claimed in claim 10, further comprising a buffer clad region, wherein the buffer clad region has a second relative refractive index $\Delta 2$, wherein the buffer clad region separates the core and the first trench region.

14. The optical fibre as claimed in claim 10, wherein the core has a first radius r1, wherein the first radius r1 is in range of at least one of 2.5 microns to 5 microns and 2 microns to 3.15 microns.

15. The optical fibre as claimed in claim 10, further comprising a buffer clad region, wherein the buffer clad region has a second radius r2, wherein the second radius r2 is in range of at least one of 5 microns to 7 microns and 3 microns to 6 microns, wherein the buffer clad region has a second relative refractive index $\Delta 2$ of 0.

16. The optical fibre as claimed in claim 10, wherein the cladding region has a fifth radius r5, wherein the fifth radius r5 is 62.5 microns.

17. The optical fibre as claimed in claim 10, wherein the first trench region has a third radius r3, wherein the third radius r3 is in range of at least one of 12 microns to 16 microns and 12 microns to 20 microns, wherein the relative refractive index $\Delta 3$ is in range of at least one of −0.25 to −0.35 and −0.3 to −0.46, wherein the first alpha $\alpha_{trench-1}$ of the first trench region is in a range of at least one of 3 to 6 and 1.5 to 2.

18. The optical fibre as claimed in claim 10, wherein the second trench region has a fourth radius r4, wherein the fourth radius r4 is in range of at least one of 24 microns to 28 microns and 26 microns to 30 microns, wherein the relative refractive index Δ4 is in range of at least one of −0.4 to −0.55 and −0.41 to −0.57, wherein the second alpha $\alpha_{trench\text{-}2}$ of the second trench region is in a range of at least one of 3 to 6 and 5 to 9.

* * * * *